United States Patent [19]
Yamakawa et al.

[11] Patent Number: 5,504,333
[45] Date of Patent: Apr. 2, 1996

[54] SCINTILLATION CAMERA

[75] Inventors: Tsutomu Yamakawa; Hiroaki Kobayashi, both of Nishinasuno, Japan

[73] Assignee: Kabushiki Kaisha Toshiba, Kawasaki, Japan

[21] Appl. No.: 282,740

[22] Filed: Jul. 29, 1994

[51] Int. Cl.⁶ .................................................. G01T 1/164
[52] U.S. Cl. ................... 250/363.09; 250/363.07; 250/369
[58] Field of Search ................ 250/363.07, 363.09, 250/369

[56] References Cited

U.S. PATENT DOCUMENTS

| | | | |
|---|---|---|---|
| 4,095,108 | 6/1978 | Inbar et al. | 250/369 |
| 4,316,257 | 2/1982 | Del Medico et al. | 250/363.07 |
| 4,323,977 | 4/1982 | Arseneau | 250/363.07 |
| 4,424,446 | 1/1984 | Inbar et al. | 250/252.1 |
| 4,588,897 | 5/1986 | Inbar et al. | 250/369 |
| 5,345,082 | 9/1994 | Engdahl et al. | 250/367.07 |

*Primary Examiner*—Carolyn E. Fields
*Attorney, Agent, or Firm*—Oblon, Spivak, McClelland, Maier, & Neustadt

[57] ABSTRACT

In a scintillation camera processing a γ-ray emitted from a nuclide administered to a subject, there is provided an element for memorizing a plurality of linearity correction data corresponding individually to a plurality of sub windows dividing a one energy window specified to one energy spectrum distribution of the γ-ray. Further, the camera comprises an element for collecting two-dimensionally the γ-ray, an element for calculating a two-dimensional positional signal and an energy signal of the γ-ray based on information from the collecting element, an element for discriminating strength of the energy signal, an element for selecting one of the plurality of linearity correction data according to a discrimination result of the discriminating element, and an element for correcting the positional signal in linearity using the selected linearity correction data. The scintillation camera, as another aspect, further comprises an element for correcting the energy signal in deviation on an energy spectrum, the corrected energy signal being sent to the discriminating element.

12 Claims, 4 Drawing Sheets

SCINTILLATION CAMERA

BACKGROUND OF THE INVENTION

The present invention relates to a scintillation camera, and particularly to a scintillation camera comprising a circuit for correcting a positional signal and energy signal which are obtained by detecting γ (gamma) rays emitted from a subject.

A scintillation camera is suitably used as imaging means for a nuclear medical diagnostic apparatus such as a single photon ECT (SPECT).

Such a scintillation camera obtains two-dimensional positional information and energy information of γ-rays emitted from the nuclide administered to a subject. When the γ-ray enters the scintillation camera, a scintillator absorbs the energy of the γ-rays and emits fluorescent light. The fluorescent light simultaneously enters a plurality of photomultiplier tubes (PMT) through a light guide. The incident light is photoelectrically converted into electrical pulses which are output to a position/energy computing circuit from the plurality of PMT. The position/energy computing circuit computes the position and energy of the incident γ-rays on the basis of the plurality of electrical pulse signals, and outputs digital positional signals x, y and energy signal z to a correction circuit in the subsequent step.

The correction circuit comprises an energy signal correcting circuit and a linearity correcting circuit for the positional signals. The energy signal correcting circuit corrects a distribution curve position of the energy spectrum of the energy signal which changes with the incident position of the γ-rays. The linearity correcting circuit performs vector operation of the positional signals x and y by using a correction vector for each of two-dimensional positions X and Y.

At least one set of correction vector data is previously prepared for correcting the linearity. The correction vector data are previously set in one-to-one correspondence with the energy spectrum distribution of one or more nuclides used. An energy window (referred to as a "specified energy window" hereinafter) of set % (for example, 20%) is assigned to each of the energy spectrum distributions.

Figure 1:
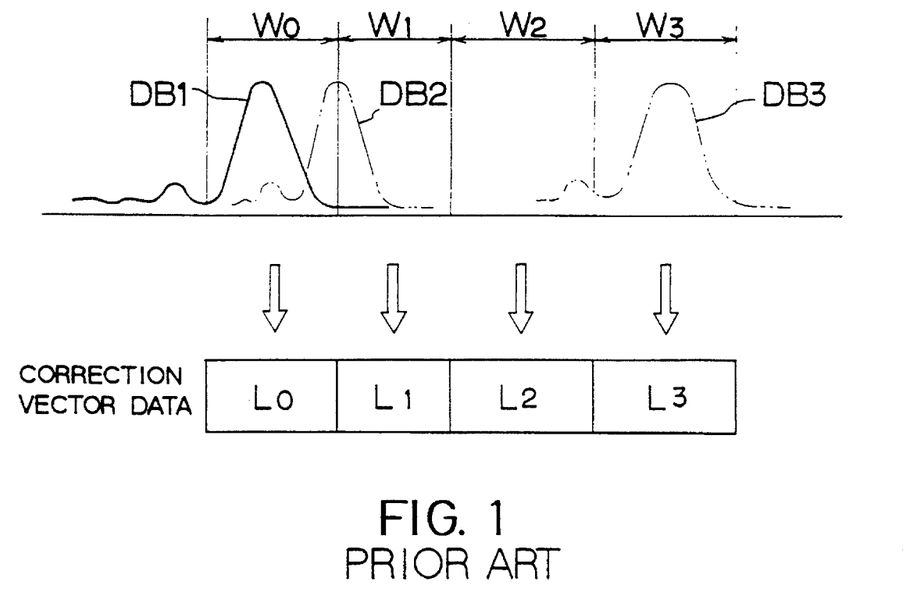
FIG. 1 is a graph showing the relation between γ-ray spectrum distribution curves and specified energy windows in accordance with conventional technique.

If four specified energy windows $W_0 \ldots W_3$ are provided for several nuclides, as shown in FIG. 1 (wherein the horizontal axis represents energy values of γ-rays and the vertical axis frequencies of each energy value), four sets of correction vector data $L_0 \ldots L_3$ are previously prepared. One of the four sets of correction vector data $L_0 \ldots L_3$ is selected by discriminating the magnitude of the raw energy signal z supplied from the position/energy computing circuit. Namely, one of the specified energy windows $W_0 \ldots W_3$ which corresponds to the magnitude of the energy signal z is decided, and the correction vector data $L_0 (\ldots L_3)$ corresponding to the decided specified energy window $W_0 (\ldots W_3)$ is selected for each incidence of γ-rays. Real-time correction of linearity is performed for the positional signals x and y by using the selected set of correction vector data.

However, the conventional correction of linearity has the problem that the correction is roughly made because only a set of correction vector data is used for a spectrum distribution.

In recent years, diagnosis has frequently been made by using unexpected nuclides or simultaneously administering two types of nuclides due to diversification of the approach to nuclear medical diagnosis.

In such a case, the center of a spectrum distribution curve deviates from the center of a single energy window (curve $DB_2$), or two spectrum distribution curves simultaneously appear (curves $DB_1$ and $DB_2$), as shown in FIG. 1.

For instance, since the curve DB2 spreads over two specified energy windows $W_0$ and $W_1$, the correction vector data $L_0$ or $L_1$ is selected according to event, and the selection is thus unstable. When two spectrum distribution curves $DB_2$ and $DB_3$ are present because two nuclides are used, the same problem occurs.

Further, the linearity of the positional signals of γ-rays having an energy value at the central portion of one specified energy window $W_0 (\ldots W_3)$ is relatively well-corrected because the correction vector data are set to the central position. However, correction accuracy deteriorates due to outward deviation from the central portion in the same specified energy window.

The variation and deterioration in the correction accuracy are directly connected with deterioration in uniformity and resolution of the photographic image formed. Namely, periodicity remains in the resolution, and the resolution itself deteriorates, thereby making it impossible to comply with recent demands for increasing precision and quality of the image formed.

When a photomultiplier tube having a large bore (for example, an incident surface having a diameter of 3 in.) is used, this problem becomes particularly significant, thereby causing difficulties in achieving compatibility between resolution and uniformity.

On the other hand, in the above-described conventional technique, since one of the correction vector data is selected on the basis of the raw energy signal z (i.e., uncorrected energy signal) output from the position/energy computing circuit, the selection of correction vector data often produces error. This also deteriorates the uniformity of resolution and the resolution itself.

The present invention has been achieved for solving the above problems of conventional technique, and an object of the invention is to improve the periodicity (uniformity) of positional resolution and the positional resolution itself by high-precision correction of linearity of positional signals in accordance with the energy value of γ-rays wherever a spectrum distribution curve of γ-rays is present.

Another object of the present invention is to improve the precision (uniformity, resolution) of linearity correction by selecting data for linearity correction on the basis of an energy signal closer to a true value.

A further object of the present invention is to achieve compatibility between uniformity and resolution of an image even when a photomultiplier tube having a detection surface having a relatively large diameter is used.

SUMMARY OF THE INVENTION

In order to achieve the objects, a scintillation camera processing a γ-ray emitted from a nuclide administered to a subject, comprising: an element for memorizing a plurality of linearity correction data corresponding individually to a plurality of sub windows dividing a one energy window specified to one energy spectrum distribution of the γ-ray, an element for collecting two-dimensionally the γ-ray, an element for calculating a two-dimensional positional signal and an energy signal of the γ-ray based on information from the collecting element, an element for discriminating strength of the energy signal, an element for selecting one of the plurality of linearity correction data according to a discrimination result of the discriminating element, and an element for correcting the positional signal in linearity using the selected linearity correction data.

It is preferred that the scintillation camera further comprises an element for correcting the energy signal in deviation on an energy spectrum, the corrected energy signal being sent to the discriminating element.

As another aspect of the present invention, a scintillation camera processing a γ-ray emitted from a nuclide administered to a subject, comprising: an element for memorizing an energy correction data for the γ-ray, the energy correction data preformed with a single reference nuclide of point source type and being used for correcting variation of an energy spectrum which varies according to incident positions of the x-ray of the scintillation camera, an element for memorizing a plurality of linearity correction data corresponding individually to a plurality of sub windows dividing a one energy window specified to one energy spectrum distribution of the γ-ray, an element for collecting two-dimensionally the γ-ray, an element for calculating a two-dimensional positional signal and an energy signal of the γ-ray based on information from the collecting means, an element for correcting the energy signal in deviation on an energy spectrum using the energy correction data for the positional signal, an element for discriminating strength of the corrected energy signal, an element for selecting one of the plurality of linearity correction data according to a discrimination result of the discriminating element, an element for correcting the positional signal in linearity using the selected linearity correction data, an element for inversely projecting the linearity-corrected positional signal using one of the plurality of linearity correction data to one reference sub window of the plurality of sub windows, the one reference sub window corresponding to a reference spectrum peak of the reference nuclide, an element for recorrecting the energy signal in deviation on an energy spectrum using the energy correction data for the inversely-projected positional signal, an element for rediscriminating strength of the recorrected energy signal, an element for reselecting one of the plurality of linearity correction data according to a discrimination result of the rediscriminating element, and an element for recorrecting the positional signal in linearity using the reselected linearity correction data.

Preferably, the reference nuclide is either one of $^{99m}$Tc and $^{57}$Co.

DESCRIPTION OF THE PREFERRED EMBODIMENTS

A first embodiment of the present invention is described below with reference to FIGS. 2, 3A and 3B.

Figure 2:
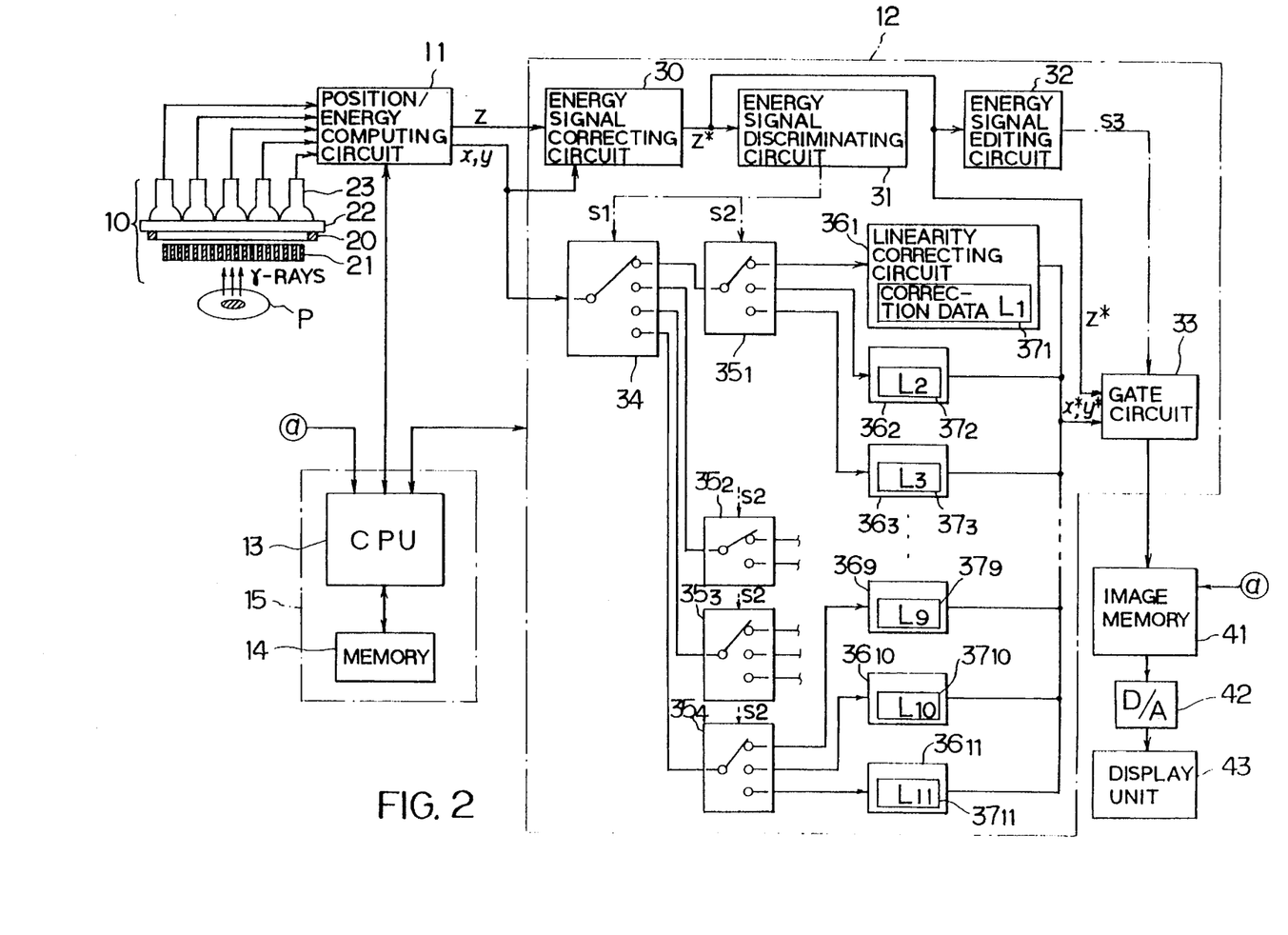
FIG. 2 is a block diagram showing a scintillation camera in accordance with a first embodiment of the present invention.
Figure 3A:
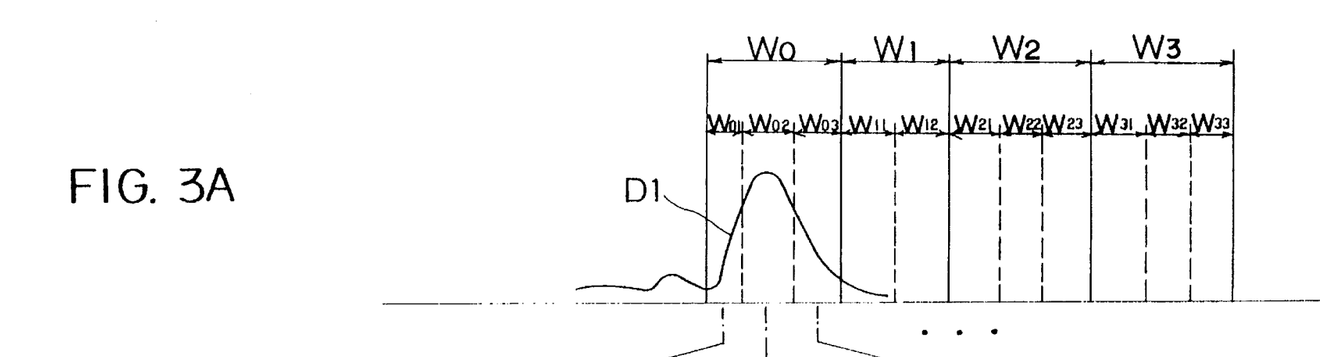
FIG. 3A is a graph showing the relation between γ-ray spectrum distribution curves and specified energy windows in accordance with the embodiment.
Figure 3B:
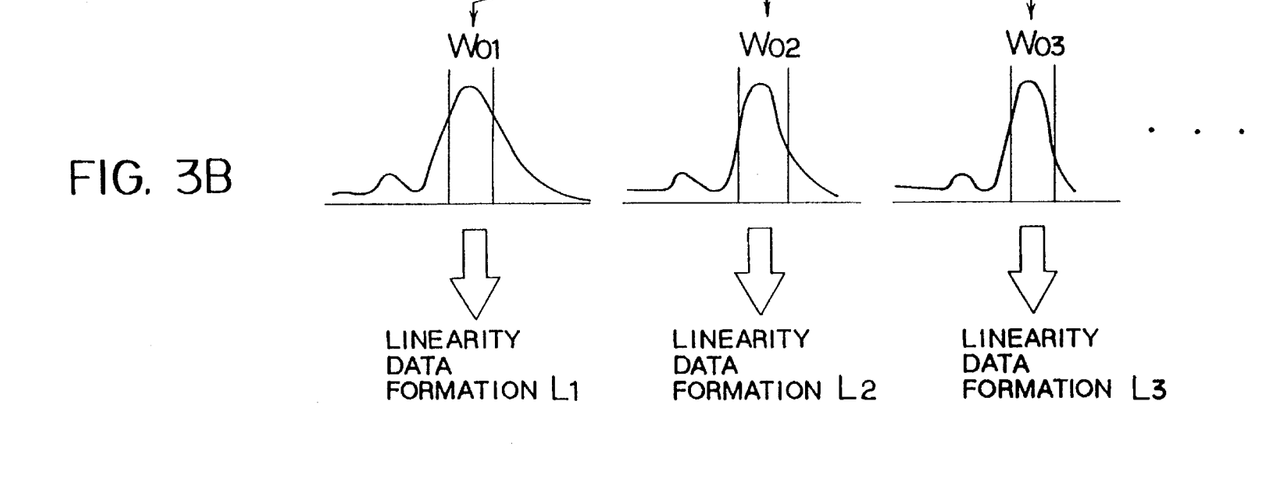
FIG. 3B is a drawing illustrating the formation of linearity correction vector data.

FIG. 2 shows an example of the construction of a scintillation camera (known as a "gamma camera") mounted on a nuclear medical diagnostic apparatus such as a single photon ECT (SPECT). The scintillation camera shown in FIG. 2 comprises a photographic section 10 disposed near a subject P, a position/energy computing circuit 11 connected to the output terminal of the photographic section 10, and a correction circuit 12 connected to the output terminal of the computing circuit 11. In order to produce necessary correction data, there is also provided a data processing unit 15 having a CPU and a memory 14.

The photographic section 10 is provided with a plate-formed scintillator 20 for absorbing the energy of the γ (gamma)-rays emitted and emitting fluorescent light from the incident points. On the side of the incident surface of the scintillator 20 is provided a collimator 21 comprising a lead plate having many parallel holes. On the back side of the scintillator 20 are arranged in a hexagonal close-packed form a plurality of photomultiplier tubes (referred to as "PMT" hereinafter) 23 ... 23 through a light guide 22. For example, 50 PMT having a diameter of 3 in. are used. When the γ-rays emitted from the subject P enter the photographic section 10, the scintillator 20 emits light from the incident points. The light is caused to enter the plurality of PMT 23 ... 23 through the light guide, and is photoelectrically converted. The PMT 23 ... 23 thus output pulse signals in proportional to the intensity of the incident light for each incidence of γ-rays.

The position/energy computing circuit 11 receives the pulse signals output from the PMT 23 ... 23. The computing circuit 11 includes pre-amplifiers, weighting resistances, an adder, etc. (not shown) to compute the position and energy of incident γ-rays on the basis of the pulse signals for each incidence of γ-rays to output a digital-type energy signal z and positional signals x, y corresponding to the computed values.

The correction circuit 12 has an energy signal correcting circuit 30, an energy signal discriminating circuit 31 and an energy signal editing circuit as elements for the input energy signal z, as shown in FIG. 2.

The energy signal correcting circuit 30 corrects positional variation of an energy spectrum according to the incident positions of γ-rays. Specifically, the correction circuit 30 detects the peak position of the energy spectrum and multiplies the energy signal by a correction coefficient corresponding to the variation to form the corrected energy signal z*. The peak of the energy signal spectrum is thus corrected for each incidence of γ-rays, and is set at a predetermined energy position independently of the incident positions.

The energy signal discriminating circuit 31 discriminates the energy values of the corrected energy signals z* input thereto, and outputs switch change-over signals S1 and S2 corresponding to the result of discrimination to the first and second selection switches, which will be described below. Since the discrimination of the energy signals is a characteristic of the present invention, it will be described below.

Energy correction of the incident light and linearity correction of an image are two important correction items in the scintillation camera. The former is achieved by the energy signal correcting circuit 30.

The linearity correction is made for correcting the distortion of linearity in an image, which is caused by differences in sensitivity between the central portion and the peripheral portion in the scintillator and PMT. The degree of distortion depends upon the distribution position of the incident γ-rays on the energy spectrum. The energy distribution on the spectrum of the incident γ-rays depends upon the nuclide administered to the subject. Like the conventional technique, the energy spectrum is divided into, for example, four regions, and energy windows $W_0 \ldots W_3$ are respectively set in the four regions, as shown in FIG. 3A. These four continuously-divided energy windows $W_0 \ldots W_3$ can cover almost all the energy distributions used in SPECT diagnosis carried out today using various nuclides. Each of the windows $W_0 \ldots W_3$ is a window having an energy width in which the set width of the spectrum distribution of a single nuclide (e.g., $^{99m}$Tc) falls. The energy windows $W_0 \ldots W_3$ are referred to as "specified energy windows" hereinafter. Each of the specified energy windows $W_0 \ldots W_3$ is generally set to about 20% (the energy range within ±10% of the energy of the peak position with the center at the peak position).

In this embodiment, each of the specified energy windows $W_0 \ldots W_3$ is further divided into a plurality of continuous sub windows $W_{01}, W_{02}, W_{03} (\ldots W_{31}, W_{32}, W_{33})$. The four specified energy windows $W_0 \ldots W_3$ are thus divided into the 11 continuous sub windows $W_{01} \ldots W_{33}$ in total. As a result, although, in the conventional technique, an energy spectrum distribution falls in only one signal energy window, an energy spectrum distribution falls in a plurality of energy windows in the present invention. In the example shown in FIG. 3A, the sub window $W_{02}$ is assigned to the central portion of an energy spectrum distribution D1, and other sub windows $W_{01}$ and $W_{03}$ are respectively assigned to both ends of the distribution D1. Linearity correction is separately performed in correspondence with the fine sub windows $W_{01} \ldots W_{33}$, as described below. The division width of the sub windows $W_{01} \ldots W_{33}$ is appropriately set in accordance with the energy width of the specified energy windows $W_0 \ldots W_3$, the position on the spectrum and the nuclide used.

The energy signal discriminating circuit 31 thus computes the energy value of the corrected energy signal z* for each incidence of γ-rays, and outputs the switch change-over signal S1 for selecting one of the specified energy windows $W_0 \ldots W_3$ and the switch change-over signal S2 for selecting one of the sub windows $W_{01}, W_{02}, W_{03} (\ldots W_{31}, W_{32}, W_{33})$ which are subsidiary to the specified energy windows $W_0 \ldots W_3$.

The corrected energy signal z* is input to the energy signal editing circuit 32. The editing circuit 32 compares the energy value of the corrected energy signal z* with the range of the signal energy spectrum previously set by the operator, and judges whether the corrected signal z* and the position signals x*, y* corrected in linearity as described below are stored in image memory. A gate control signal S3 corresponding to the result of judgement is output to a gate circuit 33. In other words, when the energy value of the corrected energy signal z* falls in the single energy windows, the gate control signal S3 of gate-on is output.

The correction circuit 12 further has a first selection switch 34 to which the positions signals x, y are input. The first selection switch 34 is a one-input and four-output type, and can electronically be switched between first to four output terminals on the basis of the first switch selection signal S1. The four output terminals of the first selection switch 34 are respectively connected to four second selection switches $35_1$ to $35_4$. The number of the second selection switches $35_1$ to $35_4$ and the number of the specified energy windows $W_0 \ldots W_3$ show one-to-one correspondence. Each of the second selection switches $35_1$ to $35_4$ is a one-input and two-output type or one-input and three-output type. The numbers of the output terminals of the second selection switches $35_1$ to $35_4$ respectively have one-to-one-correspondence with the numbers of the plural sub windows $W_{01}, W_{02}, W_{03} (\ldots W_{31}, W_{32}, W_{33})$ of the specified energy windows. Each of the four second selection switches $35_1$ to $35_4$ receives the second switch selection signal S2 so that it can electronically be switched between a plurality of output terminals.

Eleven linearity correcting circuits $36_1$ to $36_{11}$ in total are separately connected to the eleven output terminals of the four second selection switches $35_1$ to $35_4$ in order to secure the linearity of the image, as shown in FIG. 2. Each of the linearity correcting circuits $36_1$ to $36_{11}$ corrects the linearity of the positional signals x, y transmitted through the first and second selection switches 34 and $35_1 (\ldots 35_4)$ by using correction data $L_1 (\ldots L_{11})$ in real time for each incidence of γ-rays.

The correction data $L_1$ to $L_{11}$ are previously formed in one-to-one correspondence with the plurality of sub windows $W_0 \ldots W_{33}$ and are respectively stored in memory devices $37_1$ to $37_{11}$ contained in the linearity correcting circuits $36_1$ to $36_{11}$. Each correction data $L_1 (\ldots L_{11})$ is adjusted so that the spectrum peak of a reference nuclide is at the center of each energy window for each single energy window (refer to FIG. 3B) and is a data group consisting of a set of vector quantities on a two-dimensional plane.

The output side of the linearity correcting circuits $36_1$ to $36_{11}$ is connected in an OR connection state to the gate circuit 33. As described above, the corrected energy signal z* is also transmitted to the gate circuit 33 for each incidence of γ-rays. The gate circuit 33 thus opens the gate only when the gate control signal S3 indicates gate-on to pass the corrected energy signal z* and the positional signals x*, y* which are corrected in linearity.

The output side of the correction circuit 12 configured as described above is connected to a display unit 43 through an image memory 41 and a D/A converter 42. For each incidence of γ-rays when the gate circuit 33 of the correction circuit 12 is open (turned on), the corrected energy signal z* and the positional signals x*, y* corrected in linearity are thus stored in digital amounts in the image memory 42. The display unit 43 displays an image related to incidence of γ-rays from the subject on the basis of the data stored in the image memory 42.

Before the subject is photographed, in the state where a lead bar phantom is attached to the detection surface of the photographic section 10, the linearity correction data $L_1 \ldots L_{11}$ are formed by the position/energy computing circuit 11 on the basis of the pulses, for a reference nuclide, output from the PMT 23 ... 23, and are previously stored in the memory devices $37_1 \ldots 37_{11}$ respectively contained in the linearity correcting circuits $36_1 \ldots 36_{11}$.

In this embodiment, therefore, when the subject is photographed, the energy signal z and the positional signals x, y are transmitted to the correction circuit 12 in real time for each incidence of γ-rays. In the correction circuit 12, variation in the energy spectrum of the energy signal z is first corrected by the energy signal correcting circuit 30. Selection is then made for linearity correction by the energy signal discriminating circuit 31 to select one of the signal energy windows and one of the divided energy windows to which the energy value of the corrected energy signal z* belongs. The result of selection is reflected in the first and second switch change-over signals S1 and S2, and the first and second selection switches $34, 35_1 (\ldots 35_4)$ are switched according to the result.

The positional signals x, y are selectively transmitted to the proper linearity correcting circuit $36_1 (\ldots 36_{11})$ in accordance with the position of the energy value on the energy spectrum. For example, as shown in FIG. 3A, when it is decided that the corrected energy signal z* accompanied by incidence of a γ-ray belongs to the central sub window $W_{02}$ of the single specified energy window $W_0$, the positional signals x, y of the incidence of the γ-ray are transmitted to the second linearity correcting circuit $36_2$. When it is decided that the corrected energy signal z* accompanied by another incidence of a γ-ray belongs to the sub window $W_{01}$ at an end of the single specified energy window $W_0$, the positional signals x, y are transmitted to the first linearity correcting circuit $36_1$. Similarly, when it is decided that the corrected energy signal z* accompanied by further incidence of a γ-ray belongs to the sub window $W_{11}$ at an end of the specified energy window $W_1$, the positional signals x, y are transmitted to the fourth linearity correcting circuit $36_4$.

In the linearity correcting circuit $36_1$ (... $36_{11}$), optimum correction data $L_1$ (... $L_{11}$) stored therein is read for the input positional signals x, y for correcting the linearity of the signals. The positional signals x*, y* corrected in linearity are temporarily stored in the image memory 41 together with the corrected energy signal z*, and are then displayed as far as incidence of γ-rays is independent and belongs to the set single energy windows.

The above processing is performed in real time each time a γ-ray enters the scintillation camera. This permits linearity correction with extremely higher precision than conventional correction in accordance with the portion in the same single energy window, i.e., the central portion or the both end portions, to which the γ-ray correspond. In addition, even when a spectrum distribution spreads over two specified energy windows because the energy spectrum has a plurality of peaks due to recent administration of plural types of nuclides or a nuclide having a plurality of peaks, linearity is corrected by the windows significantly finer than conventional correction. Further, since discrimination is made for selecting a window by using the corrected energy signal z*, the selection accuracy is significantly improved as compared with conventional selection using the computed raw energy signal z. This also improves the accuracy of linearity correction, i.e., both uniformity (periodicity of resolution) and resolution.

Even when a tube having a relatively large bore is used as the PMT 23 ... 23, the positional periodicity of resolution in specified energy window distribution can thus be decreased, thereby obtaining a uniform image over the whole energy dynamic range of the position/energy computing circuit 11. This effect can increase the absolute value of positional resolution. It is also possible to inhibit the variation in uniformity of the image which is caused by slight variation in the energy spectrum or slight variation in the energy window width, and thus stabilize the image.

Although it is conceived that the thickness of the light guide 22 is decreased as much as possible for increasing the positional resolution, the decrease in the thickness decreases the response function of the PMT 23 ... 23. In order to compensate the decrease in the response function, the correction characteristics of non-linear correction of a preamplifier for amplifying the pulses output from the PMT 23 ... 23 must be made significantly severe. Even if the preamplifier possesses such excessively severe correction characteristics, periodicity remains in the positional resolution due to the slight change in the response function with the energy value. This embodiment can increase the positional resolution by changing the construction in the correction circuit 12 without such over-sensitive characteristic adjustment.

The divided sub windows $W_{01}$ ... $W_{33}$ are windows inherent to the correction circuit for the signal after the output from the position-energy computing circuit 11 is corrected in energy, and the engineer, operator, etc. need not to give attention to the energy windows during operation.

Although, in the embodiment, the linearity correction data $L_1$ ... $L_{11}$ is adjusted so that the spectrum peak of the reference nuclide is at the center of each of the divided sub windows $W_{01}$ ... $W_{33}$, the linearity correction data may be simply formed for each of the divided sub windows without adjustment by the spectrum peak, stored in the memory and used for correcting linearity of the positional signals x, y.

A second embodiment of the present invention will now be described with reference to FIG. 4, For simplified explanation, the same components as those in the first embodiment use the same reference numerals. The second embodiment employs the specified energy windows and their sub windows which are the same in configuration as in the first embodiment (refer to FIGS. 3A and 3B).

A scintillation camera of this embodiment is to correct positional signals in linearity on the basis of a corrected energy signal for fine adjustment of their linearity correction.

Prior to imaging, by the data processing unit 15 shown in FIG. 4, both energy correction data D and linearity correction data $L_1$ to $L_{11}$ are formed and stored into an energy signal correcting circuit and linearity correcting circuits explained below.

In detail, the energy correction data D are calculated for each channel based on a reference peak (measured value) of energy distribution corresponding to a sub window $W_{02}$, for instance, by placing a single nuclide of a point source $^{99m}T_c$(technetium) or $^{57}C_o$(cobalt) in front of the photographic section 10.

The linearity correction data $L_1$ to $L_{11}$ are also obtained by placing a single nuclide of a point source $^{99m}T_c$ or $^{57}C_o$. For example, a set of linearity correction data $L_2$ are measured with a point source having energy distribution corresponding to a sub window $W_{02}$, and the remaining linearity correction data $L_1$, $L_3$, $L_4$ to $L_{11}$ each corresponding to sub windows $W_{01}$, $W_{03}$, $W_{11}$ to $W_{33}$ over the four specified energy windows $W_0$ to $W_3$ are calculated with simulation using the set of measured linearity correction data $L_2$. Such simulation is carried out, as one aspect, such that the outputs from the $PMT_s$ 23 ... 23 are biased in the position/energy computing circuit 11 by differences in energy for signals (x, y, z) corresponding to the referenced sub window $W_{02}$, thus the remaining linearity correction data $L_1$, $L_3$, $L_4$ to $L_{11}$ being calculated.

The energy correction data D are linear to the outputs of the position/energy computing circuit 11, meanwhile the linearity correction data $L_1$ to $L_{11}$ are non-linear to those. There is not always a coincidence between linearity-corrected positions when energy corresponds to the sub window $W_{02}$ and to other sub windows. (This embodiment is based on the assumption that a reference peak is present in the sub window $W_{02}$, but it can be assumed that it is present in sub windows other than the sub window $W_{02}$.) Therefore, the object of the second embodiment is to improve such drawback.

Figure 4:
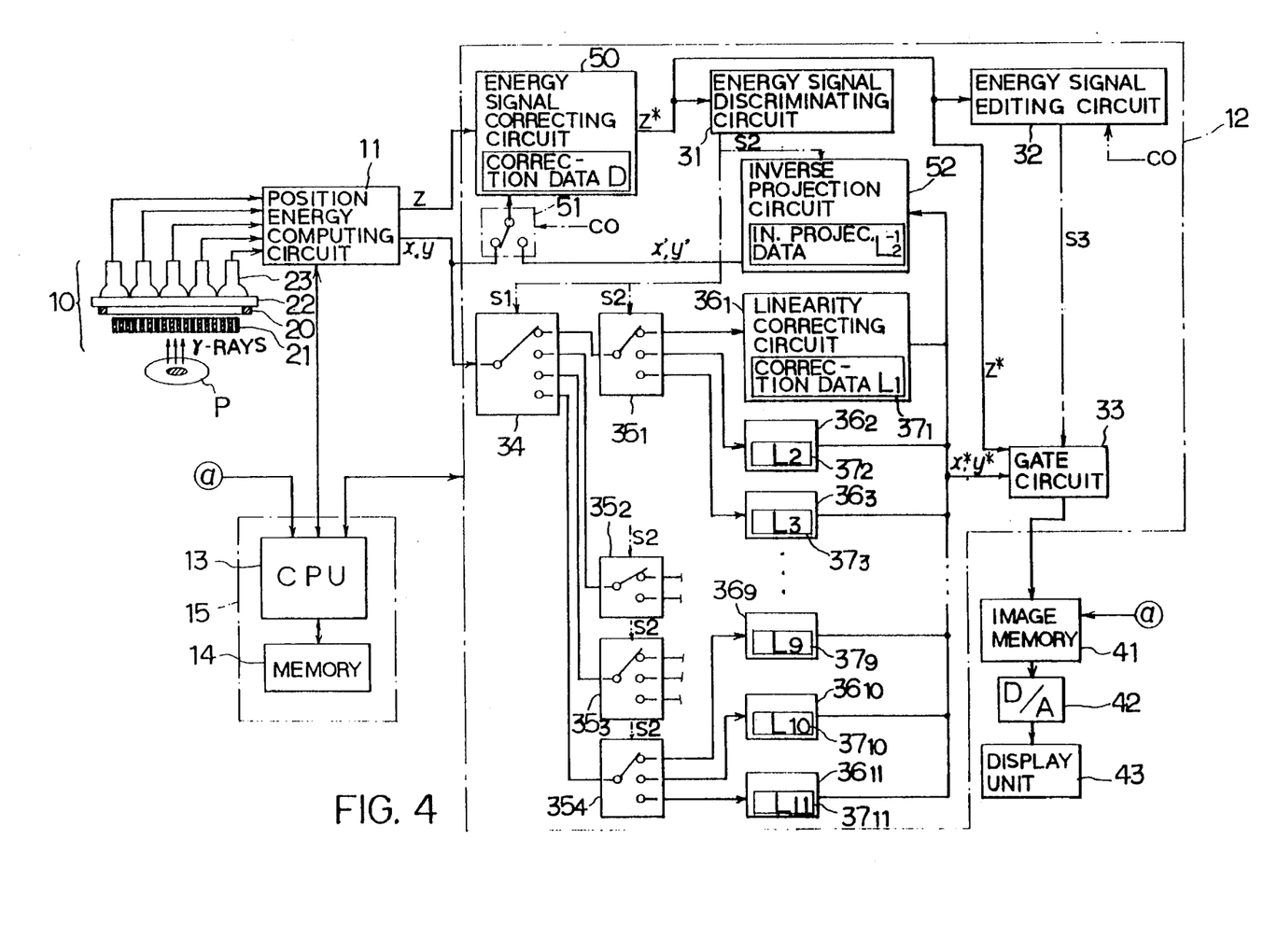
FIG. 4 is a block diagram showing a scintillation camera in accordance with a second embodiment of the present invention.

The correction circuit 12 of the scintillation camera shown in FIG. 4, in the same way as in the first embodiment, comprises first and second selection switches 34, $35_1$ to $35_4$ receiving positional signals x, y and linearity correcting circuits $36_1$ to $36_{11}$ arranged at the respective output sides of the second selection switches $35_1$ to $35_4$. The circuit 12 also comprises an energy correcting circuit 50 receiving positional signals x, y and an energy signal z. The positional signals x, y are supplied to the correcting circuit 50 through a changeover switch 51 of two-input and one-output type; one of the two input terminals receives the raw positional signals x, y from the position/energy computing circuit 11 and the other receives inversely-projected positional signals x', y' described below. The changeover switch 51 is given a change-over signal CO by a system controller (not shown) to alternately change over its two input terminals. The changeover cycle according to the changeover signal CO is set twice as short as a computing cycle in the position/energy computing circuit 11.

The above inversely-projected positional signals x', y' are obtained by an inverse projection circuit 52 arranged between the linearity correcting circuits $36_1$ to $36_{11}$ and changeover switch 51. In this embodiment, as shown in FIG. 3A, by using the linearity correction data $L_2$ (a set of measured values) of the sub window $W_{02}$ having the reference peak position within the one specified energy window $W_0$, the inverse projection circuit 52 inverse-projects linearity-corrected positional signals x*, y* of a γ-ray, which fall in one of ten sub windows $W_{02}$, $W_{03}$, $W_{11}$ $W_{33}$ deviating from the reference peak, into positional signals x', y' of the γ-ray, which fall in the sub windows $W_{02}$ having the reference peak. In other words, when the energy position of an incidence γ-ray is outside the sub window $W_{02}$ having the reference peak, obtained are original-image positional signals x', y' reduced to the reference peak.

The changeover of the changeover switch 15 permits the original positional signals x, y or inversely-projected positional signals x', y' to be alternately sent to the energy signal correcting circuit 50. With having a set of energy correction data D prestored, the correcting circuit 50 corrects an inputted energy signal z using the energy correction data D, based on the positional signals x, y or x', y'.

The output of the correcting circuit 50 is coupled with an energy signal discriminating circuit 31, energy signal editing circuit 32 and gate circuit 33.

The correction circuit 12 thus-constituted, except the editing circuit 32 arranged therein, will calculate corrected signals x*, y*, z* at a double cycle as short as a computing cycle of the position/energy computing circuit 11. The energy signal editing circuit 32, in response to the changeover signal CO from the not-shown system controller, operates to open and close the gate circuit 33 only during periods of even cycles when the changeover switch 51 changes over to the inverse projection circuit 52.

Now, it is assumed that, in response to the incidence of a γ-ray, the position/energy computing circuit 11 computes the positional signals x, y and energy signal z in a computing cycle.

In the correction circuit 12, during an odd calculation cycle corresponding to the computing cycle, the changeover switch 51 changes over to the computing circuit 11. This permits the energy signal correcting circuit 30 to correct the energy signal z based on the original positional signals x, y and to output a corrected energy signal z* to the energy signal discriminating circuit 31. As a result, in the same fashion as the first embodiment, one of the linearity correction data $L_1$ to $L_{11}$ is selected and the positional signals x, y are corrected in linearity by corresponding one of the linearity correcting circuit $36_1$ to $36_{11}$. Linearity-corrected positional signals x*, Y* are then inversely projected by the inverse projection circuit 52 with the prestored linearity correction data $L_2$, thus being converted to positional signals x', y' reduced to the specified reference peak.

At this time, the first odd cycle ends and the second even calculation cycle starts. At the same time with this start, the changeover switch 51 is next changed over to the inverse projection circuit 52.

The correcting circuit 30, this time, recorrects the energy signal z supplied within the same computing cycle, based on the inversely-corrected positional signals x', y'. The recorrected energy signal z* is again sent to the discriminating circuit 31 to be discriminated therein, which will reproduce the changeover signals S1, S2 containing another selecting destination. In response to the new changeover signals, the most suitable linearity correction data $L_1$ (to $L_{11}$) is again selected for recorrecting the positional signals x, y in linearity.

After this second recorrection, in case of a single incidence of the γ-ray, since the gate circuit 33 is opened by the editing circuit 32, the final-stage corrected signals x*, y*, z* are stored into the image memory 41.

In the next computing cycle of the position/energy computing circuit 11, the changeover switch 51 is returned to the side of the computing circuit 11 for the third calculation cycle in order to perform the same double correction in linearity as described above.

In this way, the calculation speed in the correction circuit 12 is increased twice compared with the position/energy computing circuit 11. Under such circumstance, each of the odd calculation cycles and each of the even calculation cycles are combined for processing one time of the γ-ray incidence; first, in each odd cycle, inversely-projected positional signal x', y' are created for positional signals x*, y* once corrected in linearity based on a corrected energy signal z*, and second, in each even cycle, the same correction as the first is carried out based on reduced positional signals x', y' to the reference peak. Because the first correction involves an inverse projection according to the linearity correction data $L_2$ of the sub window $W_{02}$ corresponding to the reference peak, the two times of linearity correction improves selection accuracy for the linearity correction data. Accordingly, image positions corrected in linearity in both the cases that energy falls within the sub window $W_{02}$ corresponding to the reference peak and energy falls outside the sub window $W_{02}$ are completely or almost coincident with each other. In addition, a series of the corrections are carried out in real time for each incidence of the γ-ray. Such window analysis of more accuracy enables the display unit 43 to display high-quality images.

In the second embodiment, although a single nuclide has been used for forming the linearity correction data $L_1$ to $L_{11}$ of a plurality of sub windows $W_{01}$ to $W_{33}$, an alternative way can be used, where used are different plural point sources each having energy which corresponds to each of the sub windows $W_{01}$ to $W_{33}$ for forming those linearity correction data $L_1$ to $L_{11}$.

Although, in the above embodiments, the specified energy windows $W_0$ ... $W_3$ are, for example, 20% windows, the window width can be set to, for example, 15% or 25%, by changing the deviation from the peak value.

Although, in the above embodiments, each of the specified energy windows $W_0$ ... $W_3$ is divided into three or two sub windows, the specified energy window may be divided into n (>3) sub windows. In the above embodiments, the linearity correcting data memory units are separately provided, and if the number of divided sub windows is n, as described above, memory units are produced in the same number (n) as the number of the windows. In this case, either a plurality of linearity correction data memory units or a single memory unit may physically be provided. With a single memory unit, the unit is divided into n regions.

Although the present invention is described above with reference to embodiments, the present invention is not limited to the embodiments, and various modified embodiments can of course be made.

What we claim is:

1. A scintillation camera processing a γ-ray emitted from a nuclide administered to a subject, comprising:

means for memorizing a plurality of linearity correction data corresponding individually to a plurality of sub windows dividing a one energy window specified to one energy spectrum distribution of the γ-ray, means for collecting two-dimensionally the γ-ray, means for calculating a two-dimensional positional signal and an energy signal of the γ-ray based on information from the collecting means, means for discriminating strength of the energy signal, means for selecting one of the plurality of linearity correction data according to a discrimination result of the discriminating means, and means for correcting the positional signal in linearity using the selected linearity correction data.

2. The scintillation camera according to claim 1, further comprising means for correcting the energy signal in deviation on an energy spectrum, the corrected energy signal being sent to the discriminating means.

3. The scintillation camera according to claim 2, wherein said selecting means is a means that selects one of the plurality of linearity correction data for each incidence of the γ-ray to the collecting means.

4. The scintillation camera according to claim 2, wherein said energy window is one of a plurality of energy windows continuously aligned on the energy spectrum having an energy range possible to calculate in the calculating means, the plurality of energy windows each corresponding to a plurality of reference nuclides.

5. The scintillation camera according to claim 4, wherein said plurality of energy windows is at least four in number.

6. The scintillation camera according to claim 1, further comprising means for forming the plurality of linearity correction data.

7. The scintillation camera according to claim 6, wherein said forming means is a means that forms each of the plurality of linearity correction data by using each of a plurality of reference nuclides assigned to each of the plurality of sub windows and by placing a spectrum peak of each of the plurality of reference nuclides at a center of each of the plurality of sub windows.

8. The scintillation camera according to claim 6, wherein said forming means is a means that measures one of the plurality of linearity correction data to one reference sub window of the plurality of sub windows, the one reference sub window corresponding to a reference spectrum peak of a single reference nuclide, and simulates remaining ones of the plurality of linearity correction data based on the measured linearity correction data.

9. A scintillation camera processing a γ-ray emitted from a nuclide administered to a subject, comprising:

means for memorizing an energy correction data for the γ-ray, said energy correction data being pre-formed with a single reference nuclide of point source type and being used for correcting variation of an energy spectrum which varies according to incident positions of the γ-ray to the scintillation camera, means for memorizing a plurality of linearity correction data corresponding individually to a plurality of sub windows dividing a one energy window specified to one energy spectrum distribution of the γ-ray, means for collecting two-dimensionally the γ-ray, means for calculating a two-dimensional positional signal and an energy signal of the γ-ray based on information from the collecting means, means for correcting the energy signal in deviation of an energy spectrum using the energy correction data for the positional signal, means for discriminating strength of the corrected energy signal, means for selecting one of the plurality of linearity correction data according to a discrimination result of the discriminating means, means for correcting the positional signal in linearity using the selected linearity correction data, means for inversely projecting the linearity-corrected positional signal using one of the plurality of linearity correction data to one reference sub window of the plurality of sub windows, the one reference sub window corresponding to a reference spectrum peak of the reference nuclide, means for recorrecting the energy signal in deviation on an energy spectrum using the energy correction data for the inversely-projected positional signal, means for rediscriminating strength of the recorrected energy signal, means for reselecting one of the plurality of linearity correction data according to a discrimination result of the rediscriminating means, and means for recorrecting the positional signal in linearity using the reselected linearity correction data.

10. The scintillation camera according to claim 9, wherein said reference nuclide is either one of $^{99m}$Tc and $^{57}$Co.

11. The scintillation camera according to claim 9, further comprising means for forming the plurality of linearity correction data.

12. The scintillation camera according to claim 11, wherein said forming means is a means that measures one of the plurality of linearity correction data to one reference sub window of the plurality of sub windows, the one reference sub window corresponding to a reference spectrum peak of a single reference nuclide, and simulates remaining ones of the plurality of linearity correction data based on the measured linearity correction data.

* * * * *